J. D. HILLIARD.
PRESERVING WOODEN POLES.
APPLICATION FILED JUNE 22, 1907.
1,001,144.
Patented Aug. 22, 1911.
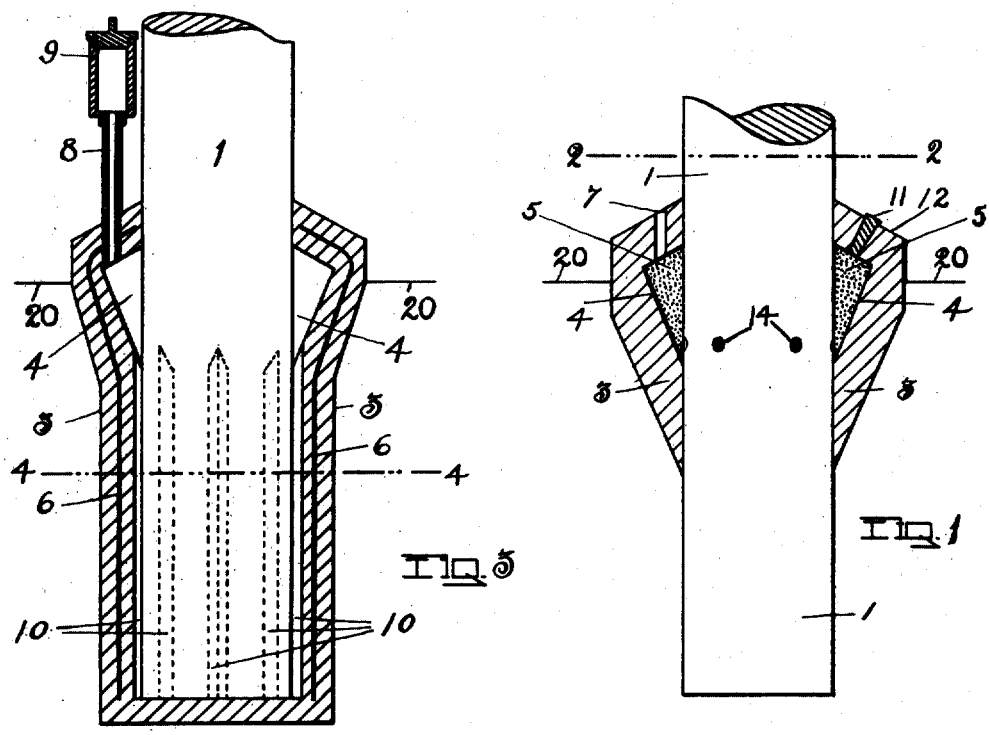

UNITED STATES PATENT OFFICE.

JOHN D. HILLIARD, OF ALBANY, NEW YORK.

PRESERVING WOODEN POLES.

1,001,144. Specification of Letters Patent. Patented Aug. 22, 1911.

Application filed June 22, 1907. Serial No. 380,280.

*To all whom it may concern:*

Be it known that I, JOHN D. HILLIARD, a citizen of the United States, residing at Albany, county of Albany, and State of New York, have invented certain new and useful Improvements in Preserving Wooden Poles, of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

My invention relates to the preservation and strengthening of that portion of a wooden pole or post, set in the ground, which portion extends a suitable distance both above and below the surface of the ground in which the pole is set.

The object of the invention is primarily to prevent the decay of the pole or post which usually takes place, in an unprotected pole, at or near the surface of the ground, as well as to strengthen, at such location, the pole or post which may or may not be partially decayed.

Various expedients have heretofore been proposed to prevent decay, such as treating the pole with antiseptic material both with and without a covering of sheet material; also by inclosing such portion of the pole in a casing with an open space between the casing and pole filled with some non-porous material intended to exclude moisture and surface water.

My invention consists in molding around the pole or post a casing of concrete, asphalt, or the like, in such a manner and place as to form an inclosed chamber, extending above and below the surface of the ground between the casing and the pole, and depositing in the chamber some well-known preservative material, as salt, which will be entirely inclosed between the pole and the molded casing, as will be hereinafter more fully set forth and specifically claimed at the end of the specification.

Figure 1 of the drawings is a vertical, central, section showing in cross-section the casing and preservative material applied to the pole, the latter being shown in elevation. Fig. 2 is a cross-section of the pole taken on the broken line 2—2 in Fig. 1 showing the upper end of the casing in plan view. Fig. 3 is a view similar to that shown in Fig. 1 showing a modified form of construction. Fig. 4 is a cross-section taken on the broken line 4—4 in Fig. 3.

The pole, 1, is shown set in the ground, the surface of which is represented by the horizontal line, 20, the upper portion of the pole being broken away for convenience of illustration. The casing, 3, is molded around the pole, as clearly shown in each of the figures of the drawing, the cement casing being packed closely about the pole at top and bottom of the casing, said packed area being relatively short at the bottom portion of the casing in Fig. 1, so that the lower end of the pole is exposed or protudes from the casing, and said packed area where the cement is packed closely about the pole at the bottom of the casing being relatively long in the species shown in Fig. 3, where it will be seen that the casing extends in direct intimate molded contact with the pole surface entirely around the bottom end of the latter, the lower portion in each instance being supported on its outer side by the earth, an excavation of the desired size having first been made in the ground. As the casing is carried above the surface of the ground the outer surface may be formed by suitable blocks of wood or molded blocks which can be easily removed after the casing is formed. The inner surface which forms the annular chamber, 4, between the casing and the pole can be molded upon some filling which is removed after the casing is partially set and before the upper portion of the casing has been closed in to engage the pole, as for example, an inflated rubber tube of the cross-sectional form desired for the annular chamber, which tube upon being deflated can be easily removed from a contracted opening left at the top which opening is afterward closed by contracting the casing and continuing the same upwardly in contact with the pole to the position shown in the drawing. When desired, however, instead of the rubber tube an antiseptic material, such as rock-salt, may be deposited around the pole as the casing is extended upwardly in sufficient quantities to produce the desired chamber. After the casing has been completed the pole around the upper edge of the casing may be treated to a coating of tar or pitch to effectually seal the joint between the pole and the upper end of the casing to prevent the ingress of water or moisture. Such a casing when made of concrete or Portland cement cannot be easily destroyed or injured and affords a complete protection for the preservative material inserted in the annular chamber between the casing and the pole.

By molding the casing upon the pole I am able to cheaply and effectually obtain a tight joint between the casing and poles or posts of differing sizes and shapes both at the upper and lower ends of the casing, the casing being easily made to fit any irregular surface on the pole. The antiseptic material, 5, deposited in such a chamber will last for a very long period and will effectually prevent decay or deterioration of that portion of the pole which extends above and below near the surface of the ground and is the only part which needs protection from the varying degrees of moisture which usually obtain near the surface of the ground. Such a casing enlarged both exteriorly and interiorly adjacent the surface of the ground and contacting with the pole both at its upper and lower ends gives great additional strength to the pole adjacent the surface of the ground, where it is most needed, while at the same time the interior enlargement provides an adequate receptacle for receiving a substantial quantity of preservative. Also the enlarged exterior portion of the casing has a much greater surface in contact with the ground, so that the pole hole is less likely to be enlarged in any direction due to strains exerted upon the upper end of the pole and the pole hence loosened therein. When desired the casing can be still further strengthened by molding into the same rods, 6, of iron or other metal, as shown in Figs. 3 and 4, extending either longitudinally or transversely.

As a means for renewing the preservative material in the annular chamber, or for inserting the same after the casing has been completed, one or more small apertures or passageways, 7, may be formed in the upper part of the casing through which the preservative material can be forced into the annular chamber or inclosure.

When desired the pipe-riser, 8, connecting at its upper end with the reservoir, 9, may be fitted tightly in the aperture, 7, and the receptacle filled with a fluid preservative after the annular chamber has been filled. The hydrostatic pressure thus formed will vary as the height of the pipe-riser and will be exerted upon the preservative material in the chamber thereby aiding and hastening the absorption of the preservative material by the pores of the wooden pole. The aperture or apertures, 7, can be plugged when this operation has been completed, thereby cutting off from the chamber formed by the casing and the pole communication with the outside atmosphere, as by plug 11.

When desired the casing may entirely inclose the lower end or butt of the pole, as shown in Fig. 3, and provided with vertical channels, 10, extending from the annular chamber to the lower end of the pole which will serve as ducts for carrying the preservative material along such portion of the pole.

It is obvious that the pole itself may be provided with vertical or inclined channels connecting with the annular chamber; also that the annular chamber itself may be formed wholly or in part by an annular groove cut in the pole. It is also obvious that the chamber intended to receive the preservative material need not extend entirely around the pole and that it may run around the pole on an incline instead of a horizontal plane and that it may be varied in cross-sectional form or area, and that small apertures or ducts, 14, may be formed in the pole in any known manner and extending in any direction communicating with the preservative chamber.

I am thus able to provide means for applying either a solid or fluid preservative having antiseptic qualities to a pole both above and below the surface of the ground and for protecting the same by wholly inclosing it between the pole and a solid and durable casing which can be easily and cheaply molded to fit poles differing in diameter and in peripheral form which casing will at the same time serve not only to materially resist breaking forces exerted upon the pole, but will tend to prevent any sagging of the pole due to a continuous lateral strain exerted thereon, such as telegraph or telephone wires hung upon a series of poles not in line with each other.

By forming the upper end of the casing in substantially the manner shown in the drawings to produce an annular inclined surface, 12, at the upper end an effectual watershed is provided without the necessity of placing thereon a metallic collar as heretofore practiced, and no separate parts are employed which are liable to be loosened and misplaced.

What I claim as new and desire to secure by Letters Patent is—

1. The combination with a pole; of a casing secured permanently on the pole in direct air-tight contact therewith interlocked with and corresponding to the surface variations of said pole and provided with a chamber between the pole and casing; and a preservative material located in the chamber.

2. The combination with a pole; of a casing fitted around the pole at its extremities and having an intermediate annular inclosure between the pole and casing; and preservative material located in the inclosure.

3. The combination with a pole, of a cement casing fitted around the same to closely engage the pole at separated points and having its walls enlarged exteriorly and interiorly, forming an annular receptacle adjacent the top thereof, preservative material in said receptacle, and means for promoting impregnation of the wood with said preservative.

4. The combination with a pole, of a casing shoe fitted therearound to closely embrace the same at separated points, the portion between said points having its walls enlarged exteriorly and interiorly and forming an annular receptacle, preservative material in said receptacle and ducts leading from said receptacle to bring the preservative into intimate contact with the pole material.

5. The combination with a pole, of a casing formed around the same to closely engage the pole at separated points, said casing diverging externally and internally between said points, forming an annular receptacle, preservative material in said receptacle, and a sealing material applied to the joint between the pole and the upper end of the casing.

6. The combination with a pole; of a casing fitted to and oppositely diverging therefrom at separated points to form a chamber between the pole and casing and an inlet to the chamber through the upper part of the casing; and preservative material in the chamber.

7. The combination with a pole; of a casing formed integrally around the pole and constituting an immovable, permanent supporting portion of the pole-structure, being shaped intermediate its ends with an internal cavity to form a chamber between the pole and casing and having an inlet to the chamber through the upper part of the casing; preservative material in the chamber; and means for closing the inlet.

8. The combination with a pole, of a casing closely fitted at separated points around the pole to form the chamber between the pole and casing, preservative material in the chamber, ducts to spread said preservative material into intimate contact with the pole texture and means for imparting hydrostatic pressure to the preservative material in the chamber.

9. The combination with a pole, of a casing closely fitted to the pole at its extremities and having an intermediate enlargement to form a preservative chamber, and a duct leading from said chamber between the casing and pole to promote the impregnation of the pole with preservative.

10. The combination with a pole; of a cement casing molded circumferentially around its lower portion with a chamber and a channel leading downwardly therefrom between the pole and casing, the casing embracing the pole at the sides of said channel; and preservative material in the chamber.

11. The combination with a pole, of a cement casing closely fitted at separated points around the lower part of the pole, said casing having an intermediate portion spaced away from the pole to form with the pole periphery a preservative chamber, and reinforcing metal embedded in the casing.

12. The combination with a pole; of a casing fitted thereto at separated points extending above and below the surface of the ground having its intermediate portion near such ground-surface comparatively large in diameter and channeled interiorly to form a chamber between the pole and casing; and preservative material in such chamber.

13. A casing for wooden poles and the like, having separated drawn-in portions adapted to closely fit a pole, with an intermediate portion internally spaced away from the pole to form with the pole periphery the walls of a preservative chamber, and reinforce wires extending through the casing walls and embedded therein.

In testimony whereof, I have hereunto set my hand this 20th day of June, 1907.

JOHN D. HILLIARD.

Witnesses:
 Geo. A. Mosher,
 William W. Morrill.